April 5, 1960  M. P. LEBOURG  2,931,440
CENTRALIZING MEANS FOR BOREHOLE APPARATUS
Filed March 15, 1956  2 Sheets-Sheet 1

*INVENTOR.*
MAURICE P. LEBOURG
BY *Robert Hockfield*
HIS ATTORNEY

April 5, 1960 M. P. LEBOURG 2,931,440
CENTRALIZING MEANS FOR BOREHOLE APPARATUS
Filed March 15, 1956 2 Sheets-Sheet 2

*INVENTOR.*
MAURICE P. LEBOURG.
BY Robert Hockfield
HIS ATTORNEY.

United States Patent Office
2,931,440
Patented Apr. 5, 1960

2,931,440

CENTRALIZING MEANS FOR BOREHOLE APPARATUS

Maurice P. Lebourg, Houston, Tex., assignor, by mesne assignments, to Schlumberger Well Surveying Corporation, Houston, Tex., a corporation of Texas Application March 15, 1956, Serial No. 571,627

12 Claims. (Cl. 166—241)

The present invention relates to borehole apparatus, and, more particularly, to a new and improved centralizer for use in boreholes which deviate substantially from the vertical.

In certain well surveying operations, an instrument is passed through a well or borehole while being maintained approximately centered therein. There are also other varieties of operations in which one or more members are passed through a borehole while being maintained in engagement with the sidewall of the borehole. For either of these purposes, at least two expansible bowed springs or spring-biased arms which engage the sidewall have been commonly used heretofore with good success to achieve centering in boreholes that deviate relatively little from true vertical.

Obviously, in any arrangement employing sidewall engaging members, the weight component of the apparatus in a radial direction relative to the borehole apparatus increases with increasing inclination of the borehole. Thus, unless the spring force is great enough to balance the radial weight component for the largest inclination angles to be encountered, centering action or wall contact, as the case may be, may be undesirably impaired at extreme inclination angles.

Furthermore, a spring force great enough to accommodate all anticipated inclination angles may undesirably impede movement of the borehole apparatus and may also cause damage to the borehole wall. Since the established spring force is independent of inclination angle, these deficiencies occur whether the inclination angle is small or large.

It is therefore an object of the present invention to provide a new and improved device for centering an instrument in a borehole which may have any angle of deviation from the vertical.

A further object of the invention is to provide a new and improved apparatus for centering an instrument in a borehole wherein the total radial force exerted on the borehole wall is dependent only upon the weight of the instrument and the amount of borehole deviation from the vertical.

A still further object is to provide a new and improved apparatus for centering an instrument in a borehole wherein the centering forces on the instrument are restricted to a desired section of the instrument in such a manner that the degree of force of contact between the remainder of the instrument and the borehole wall is independent of the angle of deviation.

These and other objects are attained by positioning a centralizer about the center of gravity of an elongated instrument, the centralizer comprising a plurality of semi-rigid fins or arms having portions adapted to contact the borehole wall. No matter what the degree of inclination of the borehole, the weight of the instrument can always be considered as acting vertically through the center of gravity. This weight may be resolved into a component acting axially along the borehole and a component acting radially. The axial component produces an equal and opposite tensile force on the cable means supporting the borehole apparatus. The arms secured to the centralizer transmit the radial component to the borehole wall, and since the arms are substantially rigid, the instrument is aligned in the borehole over a wide range of borehole inclinations.

In accordance with another embodiment of the invention, expansible arms or springs are attached to the lower portion of the borehole apparatus provided with a centralizer as above and are free to extend to the wall and make contact. The centering forces are provided by the centralizer positioned about the center of gravity, and the spring arms at the lower portion of the instrument need not provide additional centering forces. This design of centering permits the contact forces of the spring arms at the lower end of the instrument to be completely independent of borehole deviation.

The invention may be better understood from the following detailed description of the several typical embodiments, taken in conjunction with the accompanying drawings in which.

Figure 1:
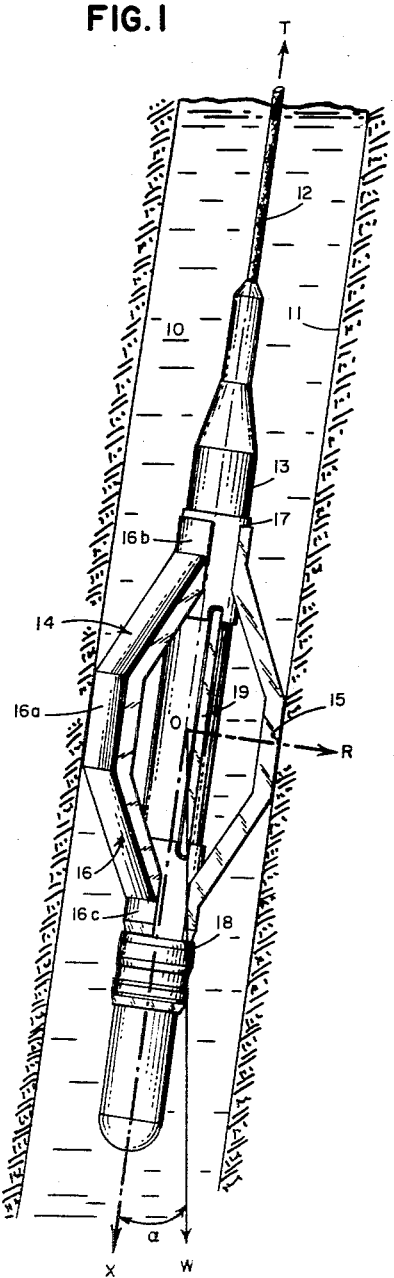
Fig. 1 is a longitudinal section of a borehole showing a schematic perspective view of a borehole apparatus fitted with a centralizer according to the present invention.

In Fig. 1 of the drawing there is shown a borehole apparatus including an instrument assembly 10 suspended in a borehole 11 which is inclined at an angle α from the vertical. Instrument assembly 10 is attached to a wire line, cable or other means 12 by which it may be lowered into borehole 11. Instrument assembly 10 comprises an elongated cylindrical instrument body 13 and a centralizer 14.

The weight W of instrument assembly 10 always acts vertically through the center of gravity O, and the force of weight W may be resolved into an axial component X and a radial component R. Axial component X produces an equal and opposite tensile force T on cable 12. Radial component R is transmitted to the borehole wall at an annular region 15 which lies on the borehole wall in a plane passed through the center of gravity O perpendicular to the longitudinal axis of borehole 11.

Centralizer 14 is comprised of three or more semi-rigid arms or fins 16 and is placed at the center of gravity O of instrument assembly 10. The arms 16 include respective central sections 16a parallel to and spaced laterally from instrument body 13 and are adapted to engage the sidewall of borehole 11 at annular region 15 of the borehole wall. At their free ends 16b and 16c the wall-engaging arms 16 are connected in a manner to be explained more fully hereafter to collars 17 and 18 supported on instrument body 13. The collars 17 and 18 are connected together by a plurality of spacer bars 19, which maintain the collars in fixed, longitudinally spaced apart relation. Collars 17 and 18 and bars 19 form a rigid sleeve-like member to receive instrument body 13. In the preferred embodiment shown, three equally spaced wall-engaging arms 16 with three interspersed spacer bars 19 are used, however any number of arms and spacer bars might be used without departing from the principles of this invention.

Figure 2:
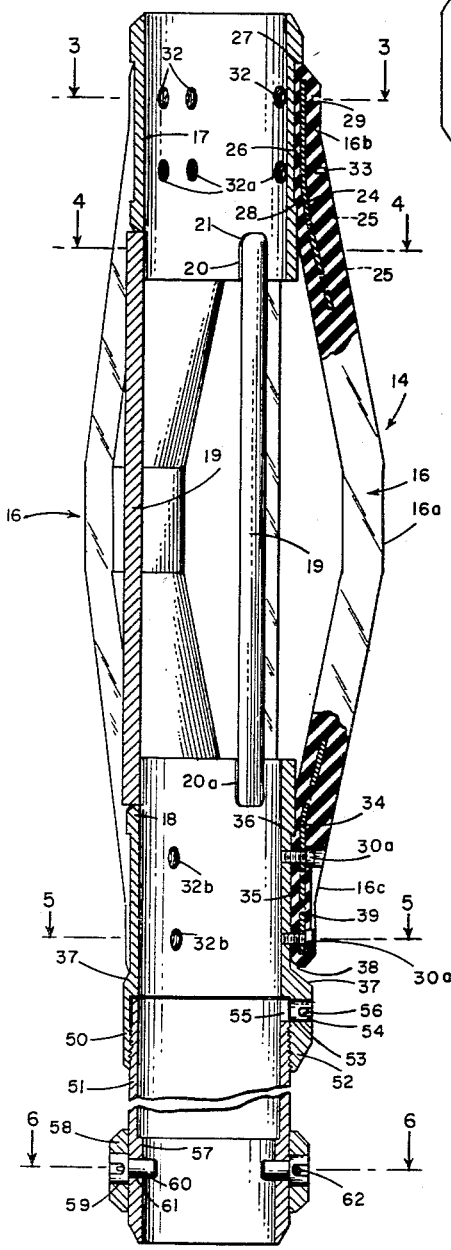
Fig. 2 is a longitudinal section view of the centralizer of Fig. 1 taken in the plane of the sheet and drawn to an enlarged scale.
Figure 4:
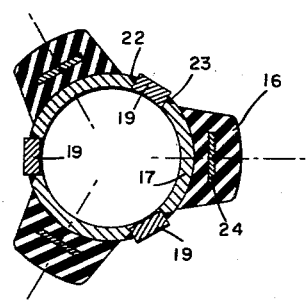
Fig. 4 is a cross section of the apparatus of Fig. 2 taken on line 4—4.

As best seen in Fig. 2, upper collar 17 has three equally spaced recesses 20 at its lower end, and lower collar 18 has similar aligned opposing recesses 20a at its upper end. Recesses 20 are substantially rectangular in shape and have rounded outer corners 21 and chamfered outer faces 22 (seen in Fig. 4), and recesses 20a are similarly equipped. Spacer bars 19 have their corners rounded and are fitted into respective pairs of recesses 20 and 20a and are, for example, brazed or welded to collars 17 and 18. Thus, as shown in Fig. 4, the brazing may result in a metallic deposit or fillet 23 joining a chamfered face 22 to the side of a bar 19.

Arms 16 are preferably made of hard rubber but may also be made of any semi-rigid material which can be considered to be essentially rigid but which will deform when any force in the direction of axial component R of the weight W of the instrument assembly exceeds that weight W, as for instance, during tight borehole conditions. Rubber arms 16 are constructed so that the maximum diametric dimension of the centralizer, i.e. of the cylinder defined by central sections 16a, is equal to, or slightly smaller than, the bit size or minimum borehole diameter in which instrument assembly 10 may be lowered. Of course, different sizes of centralizers may be utilized for different hole diameters.

The central portions 16a of rubber wall-engaging arms 16 are substantially rectangular in shape, but the arms taper inwardly toward their ends 16b and 16c to facilitate mounting on collars 17 and 18. Embedded in upper, tapered end 16b of each arm is a relatively stiff metal plate 24 which is curved in part to conform to the configuration of collar 17 and which lends rigidity to end 16b. A plurality of openings or slots 25 facilitate bonding of the ruber material of arm end 16b to the plate. A major portion of upper end 16b is received in a shallow annular recess 26 in collar 17 which forms a seat for the arm end. To inhibit longitudinal movement of arm end 16b, shallow recess 26 is provided with shoulders 27 and 28, shoulder 27 at the upper end of collar 17 being of sufficient extent to encompass the entire terminal portion of arm end 16b.

Figure 3:
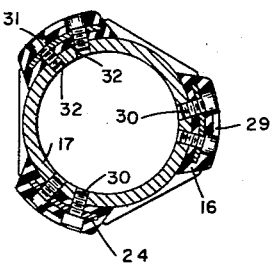
Fig. 3 is a cross section of the apparatus of Fig. 2 taken on line 3—3.

Upper arm end 16b is provided with a transverse recess 29 which, as best seen in Fig. 3, receives the heads of a pair of transversely spaced cap screws 30. The bodies of the cap screws pass through openings 31 in plate 24 and are threaded into respective ones of threaded openings 32 in collar 17. Screws 30 are tightened so that their heads firmly engage plate 24 thereby to secure upper arm ends 16b to collar 17. Another lower pair of cap screws (not shown) are received by another transverse recess 33 in arm end 16b and after passing through apertures in plate 24 are threaded into openings 32a in collar 17.

The lower end 16c of each arm 16 is provided with an embedded stiffening plate 34, like plate 24, and is seated in shallow annular recess 35 in lower collar 18. The upper extremity of collar 18 has a shoulder 36 which inhibits upward movement of arm end 16c and an inclined lower termination 37 on which a rounded corner 38 of arm end 16c may ride under conditions to be described hereafter.

Figure 5:
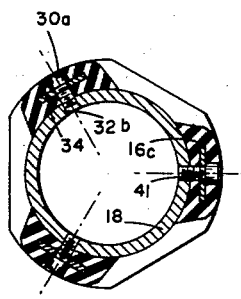
Fig. 5 is a cross section of the apparatus of Fig. 2 taken on line 5—5.

Each lower arm end 16c of each arm 16 is releasably secured to lower collar 18 by two cap screws 30a. Screws 30a are disposed in a longitudinal recess 39 in arm end 16c, pass through respective openings 41 (see Fig. 5) in plate 34 and are threaded into respective tapped holes 32b in collar 18. Like screws 30, screws 30a secure arm ends 16c to collar 18 but are constructed of a material of a selected shear strength so that upon the application of a longitudinal force to arm end 16c of at least a predetermined value, screws 30a are sheared by plate 34.

Collar 18 has a thickened internally threaded lower end 50 which receives the threaded upper end of a sleeve 51. Thickened lower end 50 has a hump portion 52 at one side provided with an aperture 53 that receives a plug 54 which serves to lock sleeve 51 in place when the plug projects into a recess 55 in the upper end of sleeve 51. Plug 54 is fixed in place by any conventional means, such as, for instance, a cotter pin 56.

Figure 6:
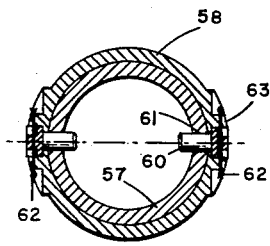
Fig. 6 is a cross section of the apparatus of Fig. 2 taken on line 6—6.

The extreme lower end 57 of sleeve 51 is of slightly reduced diameter to make possible a tight fit on instrument body 13. Another collar 58 receives the reduced diameter portion 57 of sleeve 51 and has a pair of opposed apertures 59 to receive cap plugs 60, which also extend through opposed apertures 61 in sleeve 51. As shown in Fig. 6, cotter pins 62 extend through aligned apertures in the cap plugs and in sections 63 of collar 58 and secure the plugs in place. The inner ends of plugs 60 extend within sleeve 51 to engage sockets (not shown) in the housing of instrument body 13 thereby to secure the centralizer 14 to the instrument body.

In operation, as the instrument assembly 10 is passed through borehole 11, one or more of arms 16 transmit the radial component R of the weight W of the instrument assembly to the borehole wall. The axial component X produces an equal and opposite tensile force T on cable 12. Centralizer 14 is secured to instrument body 13 at a location such that essentially flat central sections 16a of arms 16 are bisected by a plane passed through the center of gravity O perpendicular to the longitudinal axis of the borehole. Central flat portions 16a provide sufficient length of contact on the borehole wall to distribute the radial component R of weight W and to compensate for any small error in locating the center of gravity, and thereby minimize tilting of assembly 10 about center O. However, this length of contact must not be made so long as to create undue frictional forces caused by flat portions 16a rubbing on the borehole wall as assembly 10 passes through the borehole. Since the diametric dimension of rubber arms 16 is chosen such that flat central portions 16a contact the borehole wall at the center of gravity of instrument assembly 10 and since these rubber arms are essentially rigid, the assembly will be substantially centered in borehole 11 for any angle of deviation α. With the stability provided by the length of contact of flat central portions 16a and the centering provided by semi-rigid arms 16, the axis of instrument assembly 10 will coincide with the axis of borehole 11 for all angles of borehole deviation. Thus, borehole apparatus embodying the present invention provides excellent centering action, yet the radial force exerted on the borehole wall is dependent only upon the weight of the instrument and the amount of borehole deviation from the vertical.

In the event that the centralizer is pulled through a tight or reduced borehole diameter section, deformation of arms 16 may occur since they have some degree of flexibility. In particular, the arms are preferably designed so that deformation occurs only when the radial force component exceeds the weight of the assembly W.

In cases of severe deformation, collapsing means for the arms are provided. Thus, when the inward force on flat arm portions 16a is great enough to provide more than the predetermined force on lower arm portions 16c, screws 30a shear. Arms 16 collapse and rounded edge 38 on each arm 16 rides up inclines 37. Obviously, this is an important safety feature minimizing the possibility of the borehole apparatus becoming jammed in the borehole.

Figure 7:
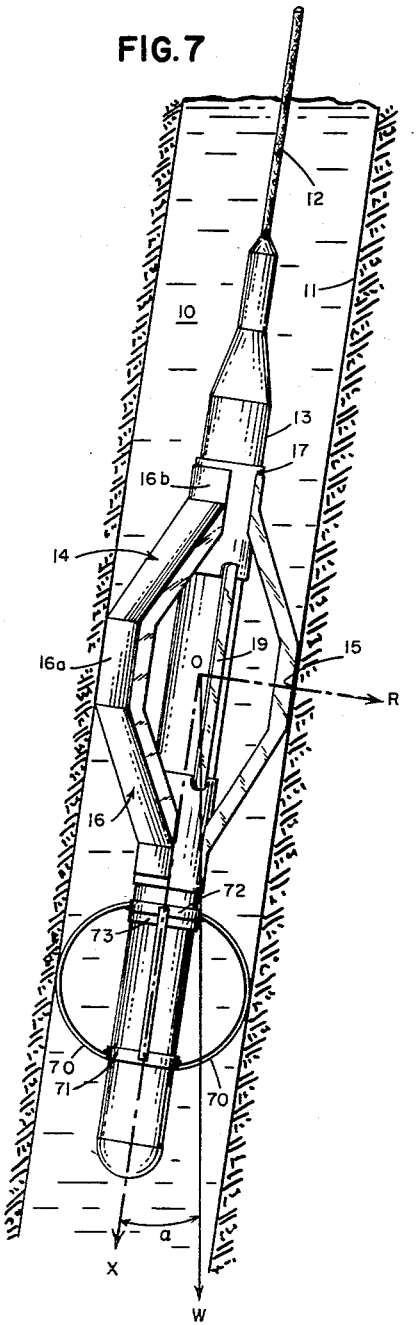
Fig. 7 represents a modification which may be made to the apparatus of Fig. 1.

In the modification of Fig. 7, an instrument assembly 10 including an instrument body 13 and centralizer 14 like the arrangement of Fig. 1 is shown, but in addition there is secured to the lower end of instrument body 13 a plurality of bowed springs 70. Springs 70 may, for instance, be secured at their ends to a fixed lower collar 71 and a movable upper collar 72, thus permitting expansion and contraction of the springs with variations in the diameter of borehole 10. Movement of collar 72 is limited by means of a flange 73 on instrument body 11. Such an expansible spring arms arrangement may, for example, be incorporated in a borehole caliper as shown in Patent No. 2,639,512 to J. C. Legrand or a logging apparatus as shown in Patent No. 2,712,630 to H. G. Doll. In the latter example, an electrode carrying pad (not shown) is carried by one of the springs 70 and is maintained thereby in engagement with the sidewall of borehole 11. Since centralizer 14 provides the principal centering action and is at the center of gravity O, very little force is required to maintain the lower end of instrument body 13 centered. Accordingly, springs 70 need only be very light and yet centering action and contact force between all springs and the borehole wall are readily achieved. Since little or no centering force need be provided by the spring arms, the contact force of the springs on the borehole wall may be regulated independently of borehole deviation.

From the foregoing description it is evident that in apparatus embodying the present invention, the sum total of the radial contact forces exerted by the centralizer on the borehole wall is the radial component R of the weight of the apparatus W. In a vertical hole, the total centering force would be zero in contrast to a fixed force exerted by a conventional centralizer. Thus, in boreholes of slight inclination, wear of the borehole wall is minimized and passage of the apparatus through the borehole is facilitated.

It is understood that changes and modifications may be made in the preferred embodiments described above without departing from the scope of the invention as defined by the appended claims, and said claims are meant to cover all equivalents thereof. For example, under tight borehole conditions wall-engaging arms may be arranged to be sheared off at both ends and remain in the borehole. Further, if desired, the shape of the rubber arms could be such that they resemble thin solid fins of essentially rigid or semi-rigid material.

I claim:

1. Apparatus including an instrument body adapted to be lowered into a borehole, a centralizer for said instrument body comprising an upper and a lower collar, a plurality of equally spaced spacer bars connecting said collars to form a rigid sleeve-like member to be received on said instrument body, a plurality of equally spaced arms extending between said collars, said arms being made of a semi-rigid material so as to be deformable under a given force and having essentially flat central portions adapted to contact the borehole wall, a first fastening means fixedly securing one end of each of said arms to one of said collars, a second fastening means including a portion capable of shearing under tight borehole conditions securing the other end of each of said arms to the other of said collars, and means for removably securing said centralizer to the instrument body.

2. The centralizer of claim 1 wherein said semi-rigid arms are made of hard rubber.

3. In an apparatus to be lowered into a borehole having portions deviating from the vertical, an instrument assembly having a center of gravity from which an axial component and a radial component of force may be resolved when said assembly is in a deviated portion of the borehole, said instrument assembly comprising an elongated instrument body and a centralizer having a plurality of equally spaced arms having portions adapted to contact the borehole wall, said contacting portions being spaced outwardly at a given distance from said body so as to be in contact with the borehole wall, said arms being semirigid so as to deform only when a force in the direction of the radial component exceeds the assembly weight, and means mounting said centralizer on said instrument body about the center of gravity of said instrument assembly.

4. In an apparatus to be lowered into a borehole having portions deviating from the vertical, an instrument assembly having a center of gravity from which an axial component and a radial component of force may be resolved when said assembly is in a deviated portion of the borehole, said instrument assembly comprising an elongated instrument body and a centralizer having a plurality of equally spaced arms having portions adapted to contact the borehole wall, said contacting portions being spaced outwardly at a given distance from said body so as to be in contact with the borehole wall, said arms being semirigid so as to deform only when a force in the direction of the radial component exceeds the assembly weight, means mounting said centralizer on said instrument body at the center of gravity of said instrument assembly, and means for securing said arms to said centralizer which are responsive to a preselected force on said arms under tight borehole conditions to permit a reduction in said fixed distance.

5. In an apparatus to be lowered into a borehole having portions deviating from the vertical, an instrument assembly having a center of gravity from which an axial component and a radial component of force may be resolved when said assembly is in a deviated portion of the borehole, said instrument assembly comprising an instrument body and a centralizer, said centralizer including a plurality of equally spaced longitudinally extending arms and a sleeve-like member, means for mounting said sleeve on said instrument body, means securing said arms to said sleeve-like member, each of said arms having an essentially flat portion located laterally of the center of gravity of said instrument assembly and substantially parallel to the axis of said assembly, said flat portion being spaced at a given distance from said body so as to contact the borehole wall, said arms being semirigid so as to deform only when a force in the direction of the radial component exceeds the assembly weight.

6. In an apparatus to be lowered into a borehole, an instrument assembly having a center of gravity, said instrument assembly comprising an instrument body and a centralizer, means mounting said centralizer on said instrument body, said centralizer including a plurality of equally spaced longitudinally extending semirigid arms and a sleeve-like member receiving said instrument body, means securing said arms to said sleeve-like member including frangible means operative under tight borehole conditions to permit said arms to collapse, each of said arms having an essentially flat portion located laterally of the center of gravity of said instrument assembly and adapted to contact the borehole wall, whereby radial forces from said instrument assembly acting at the center of gravity thereof are transmitted to the borehole wall to thereby center said instrument assembly within the borehole.

7. In an apparatus for use in boreholes which deviate from the vertical, an instrument assembly having a center of gravity from which an axial component and a radial component of force may be resolved when said assembly is in a deviated portion of the borehole, said instrument assembly comprising an elongated instrument body and a centralizer including a plurality of equally spaced longitudinally extending arms and a rigid sleeve-like member receiving said instrument body, a first fastening means fixedly securing one end of each of said arms to one end of said sleeve-like member, a second fastening means for securing the other end of each of said arms to the other end of said sleeve-like member, said second fastening means including a frangible portion, each of said arms having an essentially flat central portion located so as to be bisected by a plane through the center of gravity perpendicular to the axis of the borehole, said contacting portions being spaced outwardly at a given distance from said body so as to be in contact with the borehole wall, said arms being semirigid so as to deform only when a force in the direction of the radial component exceeds the assembly weight.

8. In an apparatus for use in boreholes deviating from the vertical, an instrument assembly having a center of gravity from which an axial component and a radial component of force may be resolved when said assembly is in a deviated portion of the borehole, said instrument assembly including a plurality of wall-engaging members supported in a spaced longitudinal relation to the center of gravity of said instrument and biased into engagement with the borehole wall, said instrument assembly also including a centralizer positioned about the center of gravity of said instrument assembly and including a plurality of equally spaced arms having portions adapted to contact the borehole wall, said contacting portions being spaced outwardly at a given distance from said body so as to be in contact with the borehole wall, said arms being semirigid so as to deform only when force in the direction of the radial component exceeds the assembly weight, means securing said arms to said centralizer, said arms acting to transmit radial forces of the instrument assembly acting at the center of gravity to the borehole wall to center said instrument assembly in the borehole, whereby contact forces of said wall-engaging members on the borehole wall are substantially independent of the deviation of the borehole.

9. In an apparatus for use in boreholes deviating from the vertical, an instrument assembly having a center of gravity, said instrument assembly including a plurality of wall-engaging members supported in a spaced longitudinal relation to the center of gravity of said instrument and biased into engagement with the borehole wall, said instrument assembly also including a centralizer positioned at the center of gravity of said instrument assembly and including a plurality of equally spaced semirigid arms having outermost portions spaced at a substantially fixed distance from said instrument body and adapted to contact the borehole wall, means securing said arms in fixed longitudinal relation to the aforesaid center of gravity, said means securing the arms to another portion of the centralizer permitting collapse of said arms under tight borehole conditions, said arms acting to transmit radial forces of the instrument assembly acting at the center of gravity to the borehole wall to center said instrument assembly in the borehole, whereby contact forces of said wall-engaging members on the borehole wall are substantially independent of the deviation of the borehole.

10. The apparatus of claim 9 in which said arms are made of hard rubber and said portions adapted to contact the borehole wall are flat.

11. In a borehole apparatus for use in boreholes deviating from the vertical, an instrument assembly having a center of gravity from which an axial component and a radial component of force may be resolved when said assembly is in a deviated portion of the borehole, said instrument assembly comprising an instrument body and a plurality of equally spaced arms having outermost portions adapted to contact the borehole wall, said contacting portions being spaced outwardly at a given distance from said body so as to be in contact with the borehole wall, said arms being semirigid so as to deform only when a force in the direction of the radial component exceeds the assembly weight, and means mounting said arms on said instrument body about the center of gravity of said instrument assembly with said outermost portions lying in a plane through the center of gravity of said instrument assembly to thereby permit centering said instrument assembly within the borehole for all borehole inclinations.

12. The apparatus of claim 8 in which said plurality of wall engaging members are disposed in the vicinity of the lower end of said instrument assembly.

References Cited in the file of this patent
UNITED STATES PATENTS

| | | |
|---|---|---|
| 1,207,689 | Hahn | Dec. 5, 1916 |
| 1,773,398 | La Velle | Aug. 19, 1930 |
| 2,281,960 | Vacquier | May 5, 1942 |
| 2,297,568 | Leonardon | Sept. 29, 1942 |
| 2,368,737 | Badgley | Feb. 6, 1945 |
| 2,427,950 | Doll | Sept. 23, 1947 |
| 2,625,445 | Ring | Jan. 13, 1953 |
| 2,636,564 | Kluck | Apr. 28, 1953 |
| 2,651,199 | Collino et al. | Sept. 8, 1953 |
| 2,747,402 | Doll | May 29, 1956 |